(12) United States Patent
Velusamy et al.

(10) Patent No.: US 9,622,067 B1
(45) Date of Patent: Apr. 11, 2017

(54) CONTROLLING DEVICE CONNECTION BASED ON WHETHER DEVICE PROVIDES WIRELESS RELAY BACKHAUL CONNECTIVITY

(71) Applicant: Sprint Spectrum L.P., Overland Park Cumming, KS (US)

(72) Inventors: Saravana Velusamy, Olathe, KS (US); Rajil Malhotra, Olathe, KS (US); Badri P. Subramanyan, Overland Park Cumming, KS (US); Chidambaram Pavanasam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/947,590

(22) Filed: Nov. 20, 2015

(51) Int. Cl.
| | | |
|---|---|---|
| *H04W 8/02* | (2009.01) | |
| *H04W 36/08* | (2009.01) | |
| *H04W 36/16* | (2009.01) | |
| *H04W 60/06* | (2009.01) | |
| *H04W 60/04* | (2009.01) | |
| *H04W 76/02* | (2009.01) | |
| *H04W 88/16* | (2009.01) | |

(52) U.S. Cl.
CPC ............. *H04W 8/02* (2013.01); *H04W 36/08* (2013.01); *H04W 36/16* (2013.01); *H04W 60/04* (2013.01); *H04W 60/06* (2013.01); *H04W 76/02* (2013.01); *H04W 88/16* (2013.01)

(58) Field of Classification Search
CPC ....... H04W 8/02; H04W 36/08; H04W 36/16; H04W 60/04; H04W 60/06; H04W 76/02; H04W 88/16
USPC ...................................................... 455/435.1
See application file for complete search history.

(56) References Cited

U.S. PATENT DOCUMENTS

| | | | | |
|---|---|---|---|---|
| 8,477,730 B2* | 7/2013 | Rajagopalan | ......... | H04W 36/22 370/331 |
| 8,509,200 B2* | 8/2013 | Li | ....................... | H04L 12/5695 370/338 |
| 2009/0067628 A1* | 3/2009 | Pudney | ............... | H04L 63/0853 380/247 |
| 2011/0208842 A1* | 8/2011 | Mildh | .................... | H04B 7/155 709/220 |
| 2013/0083650 A1* | 4/2013 | Taleb | ..................... | H04W 8/30 370/218 |
| 2013/0157661 A1* | 6/2013 | Bhaskaran | ............ | H04W 60/00 455/436 |
| 2013/0172000 A1* | 7/2013 | Van Phan | ............. | H04W 16/26 455/450 |

(Continued)

*Primary Examiner* — Nathan Taylor (57) ABSTRACT

A method and system for managing connectivity when a signaling controller is going to be taken out of service. The method involves determining that a WCD served by the signaling controller provides wireless backhaul connectivity for a relay base station, and responsively taking action to proactively transition that WCD from being served by the signaling controller to being served by a different signaling controller without the WCD detaching and reattaching. This may enable the WCD to maintain its network connectivity, including its assigned network address, and may thus enable the relay base station to maintain its network connectivity as well, thereby helping to maintain connectivity for WCDs served by the relay base station and continuity of interfaces between the relay base station and other core network entities.

20 Claims, 4 Drawing Sheets

(56) References Cited

U.S. PATENT DOCUMENTS

| | | | |
|---|---|---|---|
| 2014/0036776 A1* | 2/2014 | Al-Shalash | H04W 40/22 370/328 |
| 2014/0051442 A1* | 2/2014 | Yang | H04W 36/12 455/436 |
| 2016/0088518 A1* | 3/2016 | Qian | H04W 28/08 370/230 |
| 2016/0269942 A1* | 9/2016 | Olsson | H04W 36/14 |

* cited by examiner

CONTROLLING DEVICE CONNECTION BASED ON WHETHER DEVICE PROVIDES WIRELESS RELAY BACKHAUL CONNECTIVITY

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless client devices (WCDs) such as cell phones, tablet computers, tracking devices, embedded wireless modules, and other wirelessly equipped devices. In turn, each base station may be coupled with a switch or gateway that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Further, such a network may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

In practice, each base station in such a network may be communicatively linked with a signaling controller that carries out various network control functions, such as managing setup of bearer connections between the base station and one or more transport networks, tracking were WCDs are located in the network, paging WCDs, and the like.

By way of example, in an LTE network, each base station (LTE evolved Node-B (eNodeB)) has a communication interface with a signaling controller known as a mobility management entity (MME), and the base station and MME each also have a respective communication interface with a gateway system that provides connectivity with a packet-switched transport network. Typically, the nodes of an LTE network would sit on a wireless service provider's core packet-switched network, and so the base station and each other network entity may have an assigned Internet Protocol (IP) address on that network, and the interfaces between these entities may be defined as logical connections through that network.

In example operation, when a WCD enters into coverage of an LTE base station, the WCD signals to the base station to initiate an attach process. In this process, the base station signals to the MME, the MME authenticates the WCD, obtains and stores a context/profile record for the WCD, and engages in signaling with the base station and the gateway system to set up one or more bearers for the WCD, and the gateway system assigns an IP address to the WCD for use by the WCD to communicate on the packet-switched network. Further, as the WCD moves between tracking areas of the network, the WCD transmits tracking area updates, which pass to the MME to notify the MME where the WCD is located. And when a communication arrives at the network for the WCD while the WCD is in an idle mode, the MME may trigger paging of the WCD in the WCD's registered tracking area to facilitate delivery of the communication to the WCD.

Optimally, a wireless service provider will strategically implement base stations throughout a market area so that served WCDs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled with a WCD, referred to as a relay-WCD, and the donor base station then serves the relay-WCD in much the same way that the donor base station serves other WCDs. Further, the relay base station itself serves WCDs, in much the same way that any base station would.

With this arrangement, when the relay-WCD attaches with the donor base station, the relay-WCD may acquire connectivity and an IP address as discussed above for instance. But based on a profile record for the relay-WCD, the network (e.g., a signaling controller) may recognize that the relay-WCD is a relay-WCD (rather than a normal end-user WCD) and may therefore set up a bearer connection for that relay-WCD with a special gateway system that provides for internal core network connectivity and assigns the relay-WCD with an IP address for use to communicate within the core network. Once the relay-WCD receives that core network IP address assignment, the relay-WCD may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay-WCD, and via the special gateway system.

OVERVIEW

At various times, it may be necessary to take a signaling controller in such a network out of service. This may be necessary as the signaling controller may need to undergo maintenance, or may need to be replaced or updated. Taking a signaling controller out of service could be automated, such as on a scheduled basis, or could be triggered by manual engineering input, such as by entry through a user interface of the signaling controller or of a network management system of some sort, and could involve powering down the signaling controller or otherwise functionally disabling conventional operation of the signaling controller.

An impact of taking a signaling controller out of service is that WCDs served by the signaling controller may need to detach from the network and then re-attach, so as to be served by a different signaling controller instead. In practice, for instance, when a signaling controller is taken out of service, a base station that has an interface with that signaling controller may detect loss of communication with the signaling controller and may responsively signal to each WCD attached with the base station to cause each such WCD to detach and reattach. Each such WCD may thus newly initiate an attach process like that described above by signaling to the base station. But the base station may then signal to a new signaling controller (rather than the one taken out of service), and the new signaling controller may then engage in a process like that described above, in which the network establishes for the WCD one or more bearers, the gateway system assigns an IP address to the WCD, and so forth.

This process may work perfectly well for conventional WCDs, as any resulting interruption in connectivity for those WCDs may be viewed as just an aberration. However, this process is more problematic in a relay base station arrangement, since detachment of the relay-WCD may result in loss of network connectivity for the entire relay base station that the relay-WCD provides with wireless backhaul connectivity, which may in turn lead to the relay base station losing its IP address on the core network, and requiring establishment of new network connectivity and IP address assignment for the relay base station and new interfaces between the relay base station and other core network entities. Further, these connection issues for the relay base station may result in connection issues for WCDs served by the relay base station. Especially a market area including many relay base stations, these problems may thus have a magnified, detrimental impact on the core network and on WCD service. Therefore an improvement is desired.

Disclosed herein is a method and system for managing relay-WCD connectivity in a situation where the relay-WCD's serving signaling controller is going to be taken out of service. In accordance with the disclosure, when the signaling controller is going to be taken out of service (e.g., per a schedule or manual input), the network will determine that a WCD served by the signaling controller provides wireless backhaul connectivity for a relay base station, and the network will responsively take action to proactively transition that WCD from being served by the signaling controller to being served by a different signaling controller. Optimally, taking this action may enable the relay-WCD to maintain its network connectivity, including its assigned IP address, and may thus enable the relay base station to maintain its network connectivity, including its assigned IP address. Thus, taking this action may help maintain continuity of connectivity for WCDs served by the relay base station and continuity of interfaces between the relay base station and other core network entities. On the other hand, the disclosed process may allow other WCDs (those that are not providing wireless relay backhaul connectivity) to end up detaching and reattaching as discussed above.

Accordingly, in one respect, disclosed is a method of managing device connectivity in a wireless communication system, where the wireless communication system comprises a plurality of signaling controllers. As disclosed, the method includes determining that a first one of the signaling controllers is going to be taken out of service, where the first signaling controller serves a plurality of WCDs via one or more base stations. Further, the method includes, responsive to the determining, (i) selecting at least a first WCD from among the plurality WCDs served by the first signaling controller, where the selecting is based on the first WCD providing wireless backhaul connectivity for a relay base station, and (ii) based on the selecting, transitioning the first WCD from being served by the first signaling controller to being served by a second signaling controller before taking the first signaling controller out of service. So transitioning the first WCD from being served by the first signaling controller to being served by the second signaling controller may then help avoid having the first WCD lose network connectivity as a result of the first signaling controller being taken out of service.

In another respect, the disclosed method of managing device connectivity may involve determining that a first signaling controller is going to be taken out of service, where the first signaling controller serves a plurality of WCDs via one or more base stations, where a first one of the WCDs provides wireless relay backhaul connectivity, and a second one of the WCDs does not provide wireless relay backhaul connectivity. Further, the method may involve, responsive to the determining, differentially handling service of the first WCD and the second WCD, where the differential handling includes (i) based on the first WCD providing wireless relay backhaul connectivity, proactively transitioning the first WCD from being served by the first signaling controller to be served by a second signaling controller, wherein the proactive transitioning is done before the first signaling controller is taken out of service and is done without the first WCD detaching from and reattaching with the wireless communication system and (ii) allowing the second WCD to detach from and reattach with the wireless communication system as a result of the first signaling controller being taken out of service.

Still further, disclosed is an MME operable in a wireless communication system, where the MME is configured to serve a plurality of WCDs via one or more base stations. As disclosed, the MME includes a network communication interface through which the MME can engage in network communication (e.g., with other entities on a core network), a processing unit, data storage, and program instructions stored in the data storage and executable by the processing unit to carry out various operations when the MME is going to be taken out of service. In line with the discussion above, the operations may include (a) determining that a WCD currently served by the MME provides wireless relay backhaul connectivity, and (b) based on the determining, and before the MME is thus taken out of service, engaging in signaling via the network communication interface to cause the first WCD to transition from being served by the MME to being served instead by another MME without the first WCD detaching from and reattaching with the wireless communication system. Optimally, the first WCD transitioning from being served by the MME to being served by the other MME without detaching and reattaching may thus facilitate continuity of the wireless relay backhaul connectivity that the first WCD provides.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
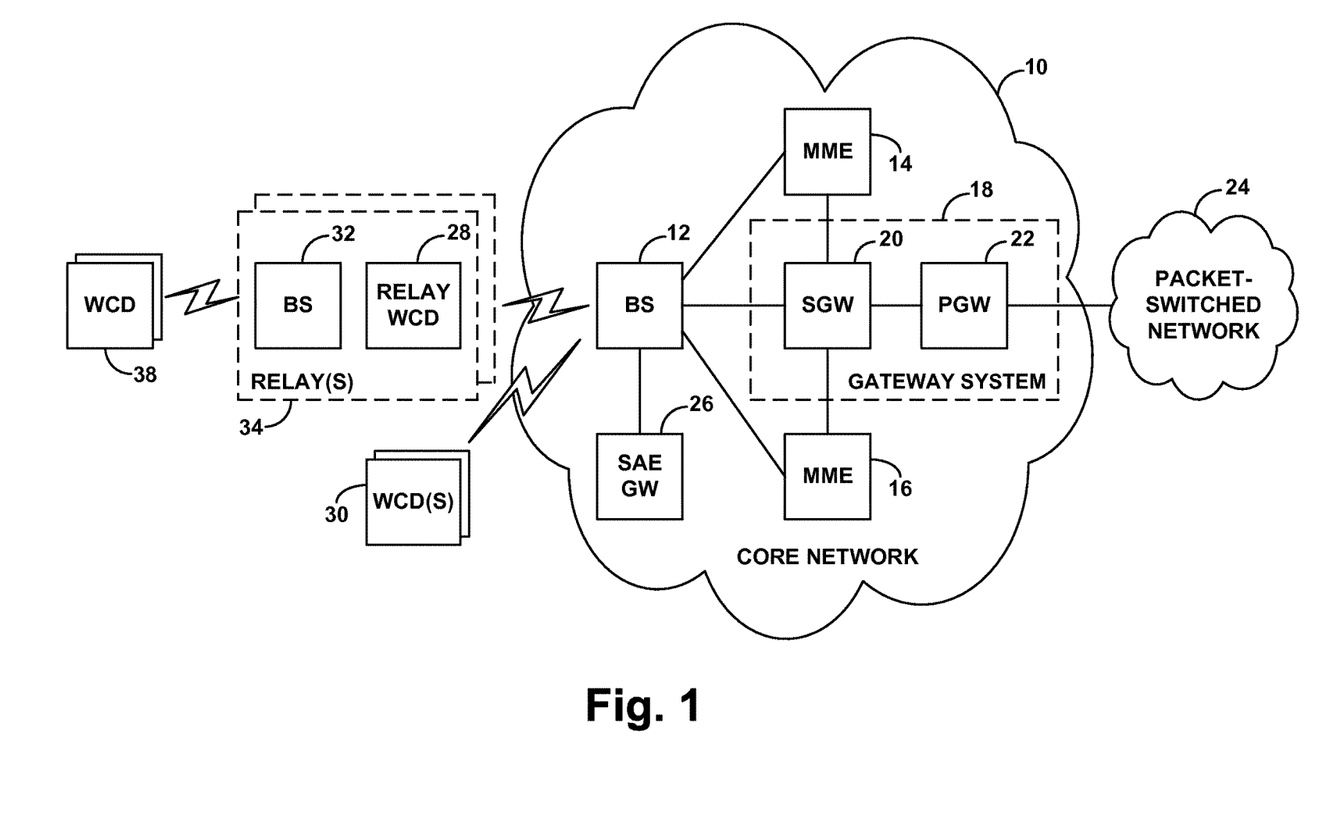
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE core network 10, which functions primarily to serve WCDs with wireless packet data communication service, including possibly voice-over-packet service, but may also provide other functions. The core network 10 may be a packet-switched network, compliant with the industry standard system architecture evolution (SAE) for the LTE protocol.

As shown, network 10 includes an example base station (BS) 12, which has an antenna structure and associated equipment (not shown) for providing LTE coverage in which to serve the WCDs. The base station 12 then has communication interfaces with two example MMEs 14, 16, each functioning as an example signaling controller for the network 10. In practice, these MMEs may be two MMEs in a pool of MMEs available for use by the base station 12. Further, the base station 12 has a communication interface with a gateway system 18, which includes a serving gateway (SGW) 20 and a packet-data-network gateway (PGW) 22, the PGW provides connectivity with a packet-switched transport network 24 such as the Internet, and each MME 14, 16 has a respective communication interface with the SGW 20 as well. As further shown, network 10 then also includes, and base station 12 has an interface with, a special gateway depicted as an "SAE GW" 26, which serves to provide connectivity within the network 10, for a relay-WCD and relay base station as noted above for instance.

Additionally shown in FIG. 1, within coverage of base station 12, are then a plurality of WCDs, including at least one relay WCD 28 and at least one non-relay WCD 30. Each non-relay WCD 30 may be an end-user WCD such as one of the types of WCDs noted above (e.g., cell phone, tablet computer, tracking device, etc.) that is not set to provide wireless backhaul connectivity for a relay base station. Whereas, each relay-WCD 28 may be a WCD that is set to provide wireless backhaul connectivity for a relay base station 32. As such, a relay-WCD could be a conventional WCD (e.g., cell phone or the like) that is locally coupled with a base station and that is configured to operate as a relay-WCD for the base station, or the relay-WCD could be a WCD module that is incorporated within a base station, thereby allowing the base station to obtain wireless backhaul connectivity and thus function as a relay base station. FIG. 1 thus further depicts relay WCD 28 and base station 32 cooperatively defining a relay 34. As such, base station 12 serves as a donor base station for relay 34, relay 34 has a wireless backhaul connection 36 with the donor base station 12, and relay 34 then provides its own wireless coverage for serving one or more other WCDs 38.

In practice, each of these WCDs may be configured within the network 10 as a device to be served by the network (such as an authorized subscriber device), and a mechanism may be provided to distinguish relay-WCDs from conventional WCDs, so as to facilitate treating relay-WCDs differently than conventional WCDs. By way of example, a relay-WCD may have a special identifier or be served by the network under a special network identifier (e.g., a special public land mobile network (PLMN) identifier, or special packet data network (PDN) connection identifier), indicating that the relay-WCD will be operating as a relay-WCD. Whereas a conventional WCD may have an identifier or be served by the network under an identifier that does not indicate the WCD will be operating as a relay-WCD and thus that may establish the WCD is not a relay-WCD. Thus, when a WCD attaches with the network, such as with base station 12, the network (e.g., the base station, MME, and/or other network entity) may determine whether the WCD is a relay-WCD (i.e., whether the WCD provides wireless backhaul connectivity for a relay base station) or not, based on such identification or other information provided by the WCD during attachment or noted in a network profile record for the WCD.

In an LTE network such as this, when base station 12 is put in service, the base station 12 may acquire an IP address for use within the network 10. Further, the base station 12 may then engage in signaling ((stream control transmission protocol (SCTP) signaling) with each of MMEs 14 and 16 to establish an S1-AP connection (S1-AP interface) with each MME. To facilitate this, the base station 12 may be pre-provisioned with data specifying the IP address of each such MME so that the base station 12 can engage in signaling with the MMEs to set up such a connection. This S1-AP connection with each MME then serves as a signaling channel between the base station 12 and the MME.

When a WCD (such as WCD 28 or WCD 30) initiates attachment with base station 12, base station 12 may then apply an algorithm (e.g., round robin, or load balancing based) to select as a serving MME for the WCD one of the MMEs with which the base station 12 has an S1-AP connection, and the base station 12 may signal to that MME. This signaling triggers establishment for the WCD of an S1-MME connection (S1-MME interface) between the base station 12 and the selected MME. Further, this signaling also causes the selected MME to engage in signaling to establish some other connections for the WCD, which may vary based on whether the WCD is a conventional WCD or rather a relay WCD. If the WCD is a conventional WCD, then the MME may engage in signaling with the base station 12 and SGW 20 to establish for the WCD an S1-U connection (S1-U interface) between the base station 12 and the SGW 20 and an S5 connection (S5 interface) between the SGW 20 and the PGW 22, and PGW 22 may assign to the WCD an IP address for use on network 24. Whereas, if the WCD is a relay-WCD, then the MME may engage in signaling with the base station 12 and SAE GW 26 to establish for the WCD an S1-U connection between the base station 12 and the SAE GW 26 and, internally within the SAE GW 26, an S5 connection, and the SAE GW 26 may assign to the WCD an IP address for use internally within network 10.

In line with the discussion above, once relay-WCD 28 acquires connectivity with donor base station 12 and receives an IP address assignment, the relay-WCD 28 may then provide that IP address to its relay base station 32, so that the relay base station 32 can use that IP address as its own address for communicating with other entities in the core network 10. The relay WCD 28 and relay base station 32 may each be programmed with processor logic to facilitate this. Once the relay base station 32 thus has an IP address on the core network, communications that the relay base station 32 has in the core network 10 will pass via a tunnel through (i) the relay-WCD 28, (ii) the radio link between the relay-WCD 28 and the donor base station 12, and (iii) the SAE GW 26.

When the relay base station 32 thus acquires an IP address in the core network 10, the relay base station 32, like base station 12 on the core network, will form an S1-AP connection with each of one or more MMEs (which could be the same or different than those used by base station 12). To facilitate this, the relay base station 32 may be pre-provisioned with data specifying the IP address of each such MME so that the relay base station 32 can engage in signaling with the MMEs to set up such a connection. This S1-AP connection with each MME then serves as a signaling channel between the relay base station 32 and the MME.

Further, when a WCD 38 initiates attachment with relay base station 32, relay base station 32 may then apply an algorithm to select as a serving MME for the WCD one of the MMEs with which the relay base station 32 has an S1-AP connection, and the relay base station 32 may signal to that MME. This signaling triggers establishment for the WCD 38 of an S1-MME connection between the relay base station 32 and the selected MME, an S1-UE connection between the relay base station 32 and the SGW 20, and an S5 connection between the SGW 20 and the PGW 22, with PGW 22 assigning to WCD 38 an IP address for use on network 24.

With this arrangement, when an MME that is serving any WCD attached with base station 12 is taken out of service (e.g., for maintenance), each base station that has an S1-AP connection with the MME may detect failure of its S1-AP connection, such as by an absence of heartbeat or response messages on the connection, and each such base station may responsively direct detachment and reattachment of each of the base station's served WCDs for which the base station has an S1-MME connection with that MME. In particular, the base station may transmit to each such WCD a radio link release message including a "re-attach required" cause code, and the base station may clear its record for each such WCD, deeming the WCD to be detached. In response, each such WCD may then initiate the attach procedure noted above once again, which may result in new establishment for the WCD of an S1-MME (which would be a different MME due to the first MME being taken out of service), new establishment for the WCD of S1-U, and S5 connections, and new assignment to the WCD an IP address on the core network.

As noted above, this process can be problematic for a relay base station that a relay-WCD provides with wireless backhaul connectivity. In the arrangement discussed above, for instance, if the MME serving relay-WCD 28 is taken out of service, donor base station 12 will responsively direct detachment and reattachment of relay-WCD 28, and detachment of the relay-WCD will result in relay base station 32 losing its connection to the core network. As a result, relay base station 32 may detect failure of its S1-AP connection with each of the MMEs in its pool of MMEs, and relay base station 32 may respond as noted above by directing each of its served WCDs 38 to detach and reattach. Moreover, until the relay-WCD 28 again attaches and thus restores the relay base station's backhaul connection, the relay base station 32 may stop providing service altogether.

In addition, when the MME at issue is taken out of service as noted above, there may also be a heartbeat failure between that MME and the SGW 20, which may also lead to teardown of the S1-U and S5 connections for each WCD served by the relay base station 32. Consequently, each WCD served by the relay base station 32 would lose its connection and would need to reconnect, but may be unable to do so until the relay base station's connection with the core network is restored.

Overall, this situation may lead to at least two problems: (i) all of the WCDs served by the relay base station may be forced to detach and reattach, which may lead to a significant amount of core network signaling load and, especially given the delay due to waiting for the relay-WCD to reattach first, may lead to user experience issues, and (ii) the relay base station (via the relay-WCD) may end up being assigned a new IP address, which may then require informing various other network nodes (e.g., other base stations) in the core network about that newly assigned IP address, which may add to signaling load in the network. Further, as noted above, this problem may be magnified if there are many relay base stations in the network.

As noted above, the presently disclosed method and system helps to proactively avoid this process, by dealing with relay-WCDs in a special way when their serving MME is going to be taken out of service. As explained above, the MME in this situation may (i) identify each relay-WCD that provides a relay base station with wireless backhaul connectivity, (ii) select a different MME to serve the relay-WCD, and (ii) engage in signaling to transition each such relay-WCD to be homed to the different MME without the relay-WCD detaching and reattaching.

In particular, the signaling may involve the MME transmitting to each identified relay-WCD, via the relay-WCD's serving donor base station, a directive (e.g., with an "MME relocating" cause code) that causes the relay-WCD to send a tracking area update specifying the new MME. When such a relay-WCD's donor base station receives such a tracking area update from the relay-WCD, the donor base station would thus pass the tracking area update to the specified new MME, which may work to establish for the WCD a new S1-MME connection with the new MME. Further, the signaling may involve the MME transmitting to the new MME a WCD-specific context record that the MME had stored for serving the relay-WCD, so that the new MME can then continue to serve the relay-WCD accordingly. Still further, the new MME may responsively notify the SAE GW (namely, an SGW component of the SAE GW) that the new MME will be serving the relay-WCD. Advantageously through this process, the relay-WCD's serving donor base station would thus maintain the S1-U connection that it has for the relay-WCD with the SAE GW, and the SAE GW would maintain the S5 connection and IP address assignment for the relay-WCD. Thus, the relay base station would maintain its tunnel into the core network, helping to avoid the issues noted above.

Figure 2:
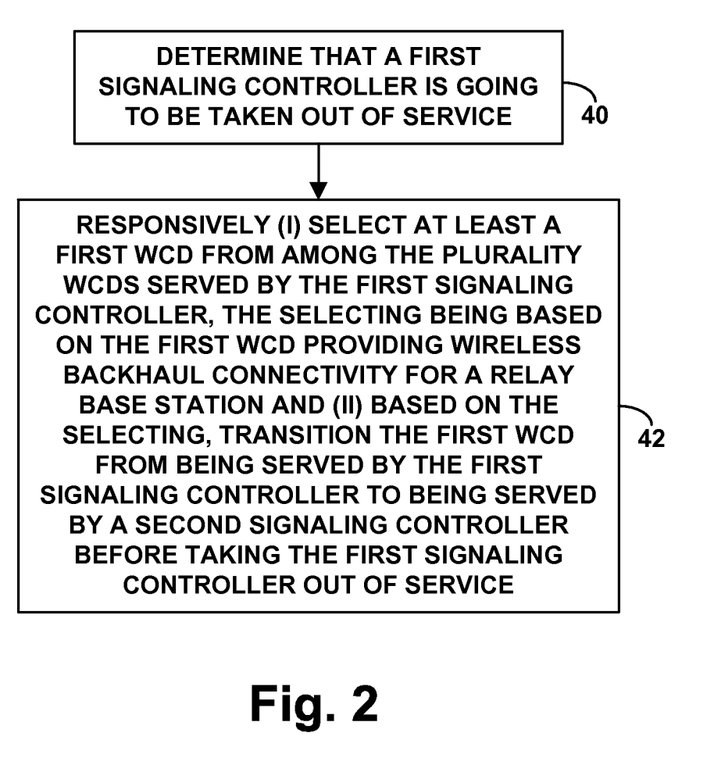
FIG. 2 is a flow chart depicting example operations in accordance with the disclosure.

FIG. 2 is next a flow chart depicting some of these operations in an example method, to manage device connectivity in a wireless communication system, where the wireless communication system comprises a plurality of signaling controllers. As shown in FIG. 2, at block 40, the method includes determining that a first one of the signaling controllers (e.g., MME 14) is going to be taken out of service, where the first signaling controller serves a plurality of WCDs (e.g., one or more conventional WCDs 30 and one or more relay-WCDs 28) via one or more base stations (e.g., base station 12). At block 42, the method then further includes, responsive to the determining, (i) selecting at least a first WCD from among the plurality WCDs served by the first signaling controller, the selecting being based on the first WCD providing wireless backhaul connectivity for a relay base station, and (ii) based on the selecting, transitioning the first WCD from being served by the first signaling controller to being served by a second signaling controller (e.g., MME 16) before taking the first signaling controller out of service. Advantageously, the act of transitioning the first WCD from being served by the first signaling controller to being served by the second signaling controller may thus help avoid having the first WCD lose network connectivity as a result of the first signaling controller being taken out of service.

When the first signaling controller is going to be taken out of service, this process can be carried out with respect to each WCD that provides wireless backhaul connectivity for a relay base station. For instance, the process could involve determining which of the WCDs served by the first signaling controller each provides wireless backhaul connectivity for a relay base station (e.g., identify each relay-WCD served by the first signaling controller), and selecting each determined WCD and transitioning each such selected WCD as noted above.

In this process, which could be carried out by the first signaling controller and/or the second signaling controller, the act of transitioning the first WCD from being served by the first signaling controller to being served by the second signaling controller could involve (i) engaging in signaling to establish for the first WCD a new signaling connection between the second signaling controller and a base station serving the first WCD, (ii) engaging in signaling with a gateway system serving the first WCD, to notify the gateway system that the second signaling controller will be serving the first WCD, and (iii) transmitting from the first signaling controller to the second signaling controller a context record for the first WCD. Further, the act of engaging in signaling to establish for the first WCD a new signaling connection between the second signaling controller and a base station serving the WCD could involve transmitting from the first signaling controller to the base station a signaling message that causes the base station to transmit to the first WCD a directive for the first WCD to transmit to the base station a tracking area update with load balancing cause code. Thus, when the first WCD then transmits the tracking area update with load balancing cause code, the base station may forward the tracking area update to the second signaling controller.

Figure 3:
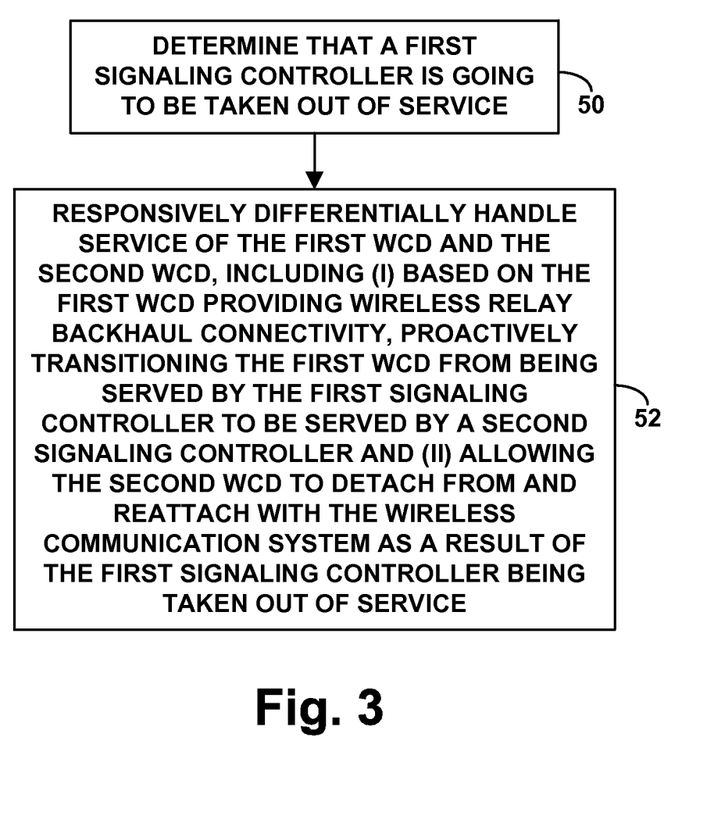
FIG. 3 is another flow chart depicting example operations in accordance with the disclosure.

FIG. 3 is next another flow chart also depicting some of the above operations in an example method, to manage device connectivity in a wireless communication system. As shown in FIG. 3, at block 50, the method includes determining that a first signaling controller (e.g., first MME) is going to be taken out of service, where the first signaling controller serves a plurality of WCDs via one or more base stations, where a first one of the WCDs provides wireless relay backhaul connectivity, and where a second one of the WCDs does not provide wireless relay backhaul connectivity. And at block 52, the method includes, responsive to the determining, differentially handling service of the first WCD and the second WCD, where the differential handling includes (i) based on the first WCD providing wireless relay backhaul connectivity, proactively transitioning the first WCD from being served by the first signaling controller to be served by a second signaling controller, where the proactive transitioning is done before the first signaling controller is taken out of service and is done without the first WCD detaching from and reattaching with the wireless communication system and (ii) allowing the second WCD to detach from and reattach with the wireless communication system as a result of the first signaling controller being taken out of service.

This process, which could be carried out by the first signaling controller and/or one or more other entities, may thus involve determining that the first WCD provides wireless backhaul connectivity (e.g., as a relay-WCD) and consequently proactively transitioning the first WCD to a new signaling controller, but determining that the second WCD does not provide wireless backhaul connectivity (or not determining that the second WCD provides wireless backhaul connectivity) and consequently letting the second WCD be forced to detach and reattach as described above. Further, in this process, both signaling controllers could be MMEs, and the first signaling controller could serve the first WCD over a first S1-MME interface between the first signaling controller and a base station serving the first WCD and could serve the second WCD over a second S1-MME interface between the first signaling controller and a base station (possibly the same base station) serving the second WCD.

In line with the discussion above, the first WCD could provide the wireless relay backhaul connectivity for a relay base station, the first WCD could have a first assigned IP address that is also used as an IP address of the relay base station, and wherein the second WCD could have a second assigned IP address. In that case, allowing the second WCD to detach and reattach could result in the second WCD's IP address changing (i.e., the second WCD being assigned a new, different IP address). Whereas, proactively transitioning the first WCD from being served by the first signaling controller to be served by a second signaling controller without detaching and reattaching could facilitate the first WCD and relay base station maintaining the assigned first IP address.

Further, in this process, the act of proactively transitioning the first WCD from being served by the first signaling controller to be served by the second signaling controller could involve causing the first WCD to transmit to a base station serving the first WCD a tracking area update message including a load-balancing cause code (and possibly specifying the second signaling controller), and the tracking area update message could result in the base station that is serving the first WCD establishing for the first WCD a signaling interface with the second signaling controller (e.g., with the received tracking area update message triggering signaling between the base station and the second signaling controller). In addition, proactively transitioning the first WCD from being served by the first signaling controller to be served by the second signaling controller further could involve the first signaling controller and/or second signaling controller engaging in signaling with a gateway system serving the first WCD, to notify the gateway system that the second signaling controller will be serving the first WCD, and transmitting from the first signaling controller to the second signaling controller a context record for the first WCD.

On the other hand, allowing the second WCD to detach from and reattach with the wireless communication system as a result of the first signaling controller being taken out of service could involve, based on the second WCD not providing wireless relay backhaul connectivity, forgoing from proactively transitioning the second WCD from being served by the first signaling controller to being served by a signaling controller other than the first signaling controller.

Figure 4:
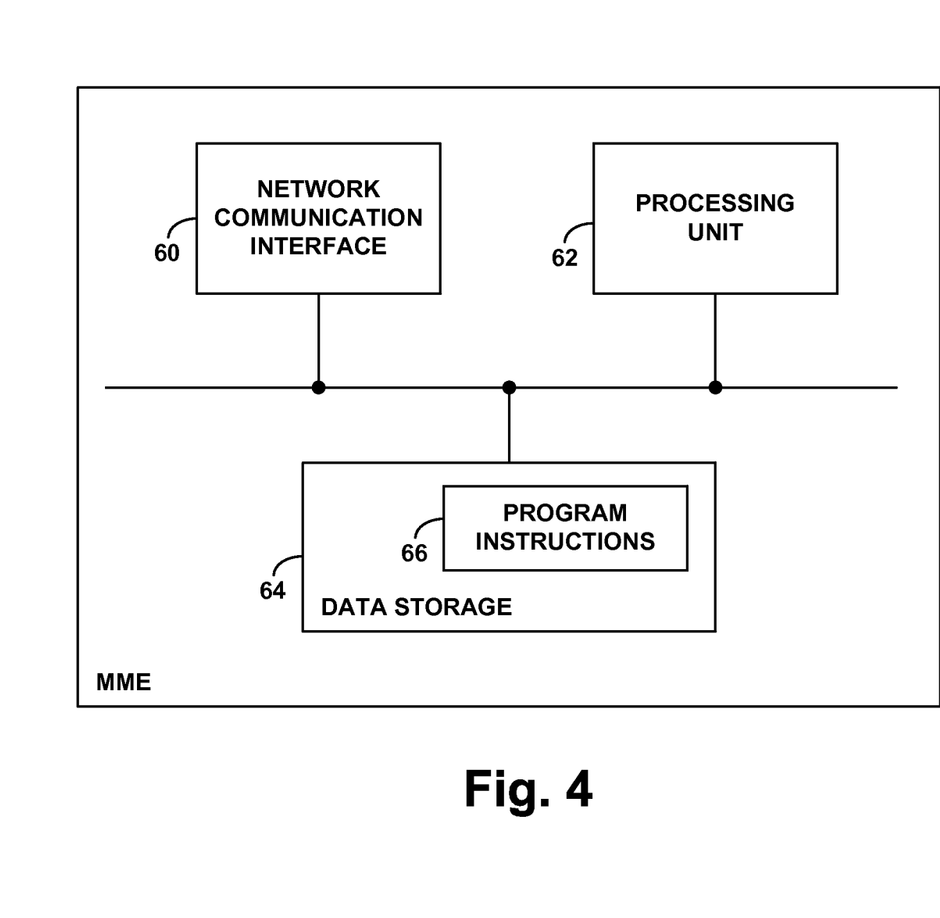
FIG. 4 is simplified block diagram of an example MME operable in accordance with the disclosure.

FIG. 4 is next a simplified block diagram of an example MME that can operate in wireless communication system and could be configured to serve a plurality of WCDs via one or more base stations. As shown in FIG. 4, the example MME includes a network communication interface 60 (e.g., Ethernet network port) through which the MME could engage in network communication, such as IP communication on a service provider's core network. Further, the MME includes a processing unit 62 (e.g., one or more general purpose or special purpose processors), non-transitory data storage 64 (e.g., one or more volatile and/or non-volatile storage components, such as magnetic, optical, or flash storage), and program instructions 66 stored in the data storage and executable by the processing unit to carry out various MME operations when the MME is going to be taken out of service (e.g., in response to a scheduled or manual input trigger).

In line with the discussion above, the MME operations could include (a) determining that a WCD currently served by the MME provides wireless relay backhaul connectivity, and (b) based on the determining, and before the MME is thus taken out of service, engaging in signaling via the network communication interface to cause the WCD to transition from being served by the MME to being served instead by another MME without the WCD detaching from and reattaching with the wireless communication system. The WCD transitioning from being served by the MME to being served by the other MME without detaching and reattaching may thus facilitate continuity of the wireless relay backhaul connectivity that the WCD provides.

As further discussed above, the WCD served by the MME could be considered a first WCD, and the MME operations could further include determining that a second WCD served by the MME does not provide wireless relay backhaul connectivity and, responsive to determining that the second WCD does not provide wireless relay backhaul connectivity, allowing the second WCD to detach from and reattach with the wireless communication system as a result of the MME being taken out of service.

In addition, the act of the MME engaging in signaling via the network communication interface to cause the WCD to transition from being served by the MME to being served instead by another MME without detaching from and reattaching with the wireless communication system could involve (i) engaging in signaling with a base station serving the WCD to trigger a tracking area update that results in the base station that is serving the WCD establishing for the WCD a signaling interface with the other MME and (ii) transmitting from the MME to the other MME a context record for the WCD, to enable the other MME to serve the WCD.

Exemplary embodiments have been described above. Those skilled in the art will understand, however, that changes and modifications may be made to these embodiments without departing from the true scope and spirit of the invention.

What is claimed is:

1. A method of managing device connectivity in a wireless communication system, wherein the wireless communication system comprises a plurality of signaling controllers, the method comprising:
   determining that a first one of the signaling controllers is going to be taken out of service, wherein the first signaling controller serves a plurality of wireless client devices (WCDs) via one or more base stations;
   responsive to the determining, (i) selecting at least a first WCD from among the plurality WCDs served by the first signaling controller, the selecting being based on the first WCD providing wireless backhaul connectivity for a relay base station, and (ii) based on the selecting, transitioning the first WCD from being served by the first signaling controller to being served by a second signaling controller before taking the first signaling controller out of service,
   whereby transitioning the first WCD from being served by the first signaling controller to being served by the second signaling controller helps avoid having the first WCD lose network connectivity as a result of the first signaling controller being taken out of service.

2. The method of claim 1, wherein each of the signaling controllers is a mobility management entity.

3. The method of claim 2, wherein the first signaling controller serves the selected WCD over an S1-MME interface between the first signaling controller and a base station serving the selected WCD.

4. The method of claim 1, wherein selecting at least the first WCD based on the first WCD providing wireless backhaul connectivity for a relay base station comprises:
   determining which of the WCDs served by the first signaling controller each provides wireless backhaul connectivity for a relay base station; and
   selecting each determined WCD.

5. The method of claim 1, carried out by the first signaling controller.

6. The method of claim 1, wherein transitioning the first WCD from being served by the first signaling controller to being served by the second signaling controller comprises:
   engaging in signaling to establish for the first WCD a new signaling connection between the second signaling controller and a base station serving the first WCD;
   engaging in signaling with a gateway system serving the first WCD, to notify the gateway system that the second signaling controller will be serving the first WCD; and
   transmitting to the second signaling controller a context record for the first WCD.

7. The method of claim 6, wherein engaging in signaling to establish for the first WCD a new signaling connection between the second signaling controller and a base station serving the WCD comprises:
   transmitting from the first signaling controller to the base station a signaling message that causes the base station to transmit to the first WCD a directive for the first WCD to transmit to the base station a tracking area update with load balancing cause code,
   wherein, when the first WCD then transmits the tracking area update with load balancing cause code, the base station forwards the tracking area update to the second signaling controller.

8. The method of claim 1, wherein determining that the first signaling controller is going to be taken out of service is done either automatically per a schedule or in response to a manual trigger.

9. A method of managing device connectivity in a wireless communication system, the method comprising:

determining that a first signaling controller is going to be taken out of service, wherein the first signaling controller serves a plurality of wireless client devices (WCDs) via one or more base stations, wherein a first one of the WCDs provides wireless relay backhaul connectivity, and wherein a second one of the WCDs does not provide wireless relay backhaul connectivity; and responsive to the determining, differentially handling service of the first WCD and the second WCD, wherein the differential handling comprises (i) based on the first WCD providing wireless relay backhaul connectivity, proactively transitioning the first WCD from being served by the first signaling controller to be served by a second signaling controller, wherein the proactive transitioning is done before the first signaling controller is taken out of service and is done without the first WCD detaching from and reattaching with the wireless communication system and (ii) allowing the second WCD to detach from and reattach with the wireless communication system as a result of the first signaling controller being taken out of service.

10. The method of claim 9, wherein each of the signaling controllers is a mobility management entity (MME), wherein the first signaling controller serves the first WCD over a first S1-MME interface between the first signaling controller and a base station serving the first WCD, and wherein the first signaling controller serves the second WCD over a second S1-MME interface between the first signaling controller and a base station serving the second WCD.

11. The method of claim 9, wherein the first WCD provides the wireless relay backhaul connectivity for a relay base station, wherein the first WCD has a first assigned IP address that is also used as an IP address of the relay base station, and wherein the second WCD has a second assigned IP address, wherein allowing the second WCD to detach and reattach results in the second WCD's IP address changing, and wherein proactively transitioning the first WCD from being served by the first signaling controller to be served by a second signaling controller without detaching and reattaching facilitates the first WCD and relay base station maintaining the assigned first IP address.

12. The method of claim 9, carried out by the first signaling controller.

13. The method of claim 9, wherein proactively transitioning the first WCD from being served by the first signaling controller to be served by a second signaling controller comprises:

causing the first WCD to transmit to a base station serving the first WCD a tracking area update message including a load-balancing cause code, wherein the tracking area update message results in the base station that is serving the first WCD establishing for the first WCD a signaling interface with the second signaling controller.

14. The method of claim 9, wherein proactively transitioning the first WCD from being served by the first signaling controller to be served by a second signaling controller further comprises:

engaging in signaling with a gateway system serving the first WCD, to notify the gateway system that the second signaling controller will be serving the first WCD; and transmitting from the first signaling controller to the second signaling controller a context record for the first WCD.

15. The method of claim 9, wherein allowing the second WCD to detach from and reattach with the wireless communication system as a result of the first signaling controller being taken out of service comprises:

based on the second WCD not providing wireless relay backhaul connectivity, not proactively transitioning the second WCD from being served by the first signaling controller to being served by a signaling controller other than the first signaling controller.

16. A mobility management entity (MME) operable in a wireless communication system, wherein the MME is configured to serve a plurality of wireless client devices (WCDs) via one or more base stations, the MME comprising:

a network communication interface through which to engage in network communication;

a processing unit data storage; and program instructions stored in the data storage and executable by the processing unit to carry out the following operations when the MME is going to be taken out of service:

(a) determining that a WCD currently served by the MME provides wireless relay backhaul connectivity, and (b) based on the determining, and before the MME is thus taken out of service, engaging in signaling via the network communication interface to cause the WCD to transition from being served by the MME to being served instead by another MME without the WCD detaching from and reattaching with the wireless communication system, whereby the WCD transitioning from being served by the MME to being served by the other MME without detaching and reattaching facilitates continuity of the wireless relay backhaul connectivity that the WCD provides.

17. The MME of claim 16, wherein the WCD is a first WCD, and wherein the operations further comprise determining that a second WCD served by the MME does not provide wireless relay backhaul connectivity and, responsive to determining that the second WCD does not provide wireless relay backhaul connectivity, allowing the second WCD to detach from and reattach with the wireless communication system as a result of the MME being taken out of service.

18. The MME of claim 17, wherein the first WCD provides wireless relay backhaul connectivity for a relay base station, wherein the first WCD has a first assigned IP address that is also used as an IP address of the relay base station, and wherein the second WCD has a second assigned IP address, wherein causing the first WCD to transition from being served by the first signaling controller to being served by the second signaling controller without detaching and reattaching facilitates the first WCD and relay base station maintaining the assigned first IP address, and allowing the second WCD to detach from and reattach with the wireless communication system results in the second WCD's IP address changing.

19. The MME of claim 17,
wherein the MME serves the first WCD over a first S1-MME interface between the first MME and a base station serving the first WCD, and
wherein the MME serves the second WCD over a second S1-MME interface between the first MME and a base station serving the second WCD.

20. The MME of claim 16, wherein engaging in signaling via the network communication interface to cause the WCD to transition from being served by the MME to being served instead by another MME without detaching from and reattaching with the wireless communication system comprises:
engaging in signaling with a base station serving the WCD to trigger a tracking area update that results in the base station that is serving the WCD establishing for the WCD a signaling interface with the other MME; and
transmitting from the MME to the other MME a context record for the WCD.

* * * * *